(12) United States Patent
Liu

(10) Patent No.: US 10,915,006 B2
(45) Date of Patent: Feb. 9, 2021

(54) LED LIGHT SOURCE FOR INDUSTRIAL INSPECTION

(71) Applicant: GFocus Technologies Co., Ltd., Suzhou (CN)

(72) Inventor: Yong Liu, Suzhou (CN)

(73) Assignee: GFOCUS TECHNOLOGIES CO., LTD., Suzhou (CN)

( * ) Notice: Subject to any disclaimer, the term of this patent is extended or adjusted under 35 U.S.C. 154(b) by 616 days.

(21) Appl. No.: 15/327,746

(22) PCT Filed: Jul. 23, 2015

(86) PCT No.: PCT/CN2015/084934
§ 371 (c)(1),
(2) Date: Mar. 29, 2017

(87) PCT Pub. No.: WO2016/011967
PCT Pub. Date: Jan. 28, 2016

(65) Prior Publication Data
US 2017/0212410 A1    Jul. 27, 2017

(30) Foreign Application Priority Data

Jul. 23, 2014   (CN) .......................... 2014 1 0352611

(51) Int. Cl.
*G03B 15/05* (2006.01)
*H05B 45/44* (2020.01)
(Continued)

(52) U.S. Cl.
CPC .............. *G03B 15/05* (2013.01); *F21V 15/01* (2013.01); *F21V 19/0015* (2013.01);
(Continued)

(58) Field of Classification Search
None
See application file for complete search history.

(56) References Cited

U.S. PATENT DOCUMENTS

| 2011/0246146 A1 | 10/2011 | Kauffman et al. |
| 2014/0016340 A1* | 1/2014 | Cho .......................... B60Q 1/02 362/516 |

(Continued)

FOREIGN PATENT DOCUMENTS

| CN | 101101098 | 1/2008 |
| CN | 101451697 A | 6/2009 |

(Continued)

OTHER PUBLICATIONS

Texas Instruments, LM3410, 2007, http://www.ti.com/lit/ds/symlink/lm3410.pdf (Year: 2007).*

*Primary Examiner* — Andrew J Coughlin
(74) *Attorney, Agent, or Firm* — Dinsmore & Shohl LLP

(57) ABSTRACT

An LED light source, comprising one or more LED modules (100-800), wherein each of the LED modules (100-800) comprises an LED (110) and a circuit board (120), the LED (110) being fixed to the circuit board (120), electrodes (121, 122) being arranged on the circuit board (120), and pins of the LED (110) being electrically connected to electrodes (121, 122); the LED light source also comprises a bearing structure (10), wherein the bearing structure (10) is provided with a plurality of bearing surfaces (13, 14, 23, 24, 33, 34) for bearing the LED modules (100-800), and various bearing surfaces (13, 14, 23, 24, 33, 34) are arranged such that the normal directions of at least two bearing surfaces are different; and the LED light source also comprises a drive circuit arranged in an enclosure (1) thereof, wherein various LEDs (D3-D10) are connected in series between a current output end and a current input end of the drive circuit. By adopting the LED modules (100-800) with a modular design and the bearing structure (10) having bearing surfaces (13, 14, 23, 24, 33, 34), a plurality of LED modules (100-800) are combined easily, the design and transplantation are convenient, and the illumination angle is adjusted easily, the (Continued)

lighting efficiency is high, and the lighting intensity is more uniform. In addition, the drive circuit is arranged in the LED light source, thereby being able to reduce system costs, reduce the volume, facilitate the use, and reduce the external influence.

15 Claims, 8 Drawing Sheets

(51) Int. Cl.
| | | |
|---|---|---|
| *F21V 15/01* | (2006.01) | |
| *F21V 19/00* | (2006.01) | |
| *F21V 23/00* | (2015.01) | |
| *F21V 23/06* | (2006.01) | |
| *G01N 21/88* | (2006.01) | |
| *F21Y 105/18* | (2016.01) | |
| *F21Y 105/16* | (2016.01) | |
| *F21Y 115/10* | (2016.01) | |

(52) U.S. Cl.
CPC ............ *F21V 23/003* (2013.01); *F21V 23/06* (2013.01); *G01N 21/8806* (2013.01); *H05B 45/44* (2020.01); *F21Y 2105/16* (2016.08); *F21Y 2105/18* (2016.08); *F21Y 2115/10* (2016.08); *G01N 2201/0621* (2013.01); *G03B 2215/0567* (2013.01)

(56) References Cited

U.S. PATENT DOCUMENTS

| | | | |
|---|---|---|---|
| 2014/0119013 A1* | 5/2014 | Rapeanu | F21S 9/022 362/242 |
| 2016/0157712 A1* | 6/2016 | Borden | A61B 3/063 351/222 |

FOREIGN PATENT DOCUMENTS

| | | |
|---|---|---|
| CN | 201355024 Y | 12/2009 |
| CN | 102691902 A | 9/2012 |
| CN | 102854148 A | 1/2013 |
| CN | 103323434 A | 9/2013 |
| CN | 103672500 A | 3/2014 |
| CN | 104132316 | 11/2014 |
| CN | 104214603 | 12/2014 |
| CN | 203980200 U | 12/2014 |
| KR | 20050009364 A | 1/2005 |
| KR | 20090053324 A | 5/2009 |
| WO | 2006019967 A2 | 2/2006 |

\* cited by examiner

LED LIGHT SOURCE FOR INDUSTRIAL INSPECTION

CROSS REFERENCE TO RELATED APPLICATION

This application claims priority from PCT/CN2015/084934 filed Jul. 23, 2015 which claims priority from Chinese patent application number 201410352611.2 filed Jul. 23, 2014.

FIELD OF THE INVENTION

The present invention relates to lighting technology, more particularly, to an LED light source for industrial inspection.

DESCRIPTION OF THE PRIOR ART

LED (Light-Emitting Diode) is a kind of semiconductor electronic elements that can convert electric energy into optical energy, and at the present time, commercially available LEDs are packaged granules, comprising two major categories: emitter and COB (Chip on Board), the core structures thereof are both LED wafers, that is, PN junctions. LED emitters and COB also comprise substrates for bearing LED wafers, on which there are pins for electric connection with the outside. LED emitters and COB can also comprise fluorescent materials for changing the colors of the emergent light, lens for guiding the emergent light and structures for heat sinking; usually, lens allows the propagation direction of the emergent light of LEDs to be perpendicular to the substrates in the LEDs.

LEDs have a wide range of applications in the field of illumination, based on which there are a variety of LED luminaries and LED light sources. In the field of automatic industrial inspection, LED light sources are the most frequently used light sources, illuminating objects under inspection while industrial cameras taking photos of the objects.

According to shapes, LED light sources can be divided into strip-shaped light sources, surface light sources, annular light sources, arched light sources, four-sided shadowless light sources and the like, wherein, annular light sources in turn have a variety of illumination angles, such as 0°, 30°, 45°, 60°, 90° and the like; according to colors, there are red light sources, blue light sources, white light sources, infrared light sources, ultraviolet light source and the like; according to driving types, there are two types: voltage driven and current driven.

As for the design of LED light sources in the prior art, numbers and distribution patterns of LEDs used are determined according to demands, and accordingly, the layout of one or two circuit boards (usually, PCB boards) is determined. Since, as described previously, the directions of emergent light of LEDs are substantially perpendicular to the planes of the substrates therein, they are substantially perpendicular to the bottom surfaces of LEDs, therefore, in LED light sources with a certain illumination angle (not 0° or 90°), especially, in annular light sources, usually, the light emitting windows of light sources are designed to have corresponding angles (if conditional, it is likely that some reflecting elements are arranged in the light sources) to achieve effects of low angle illumination or high angle illumination. Their drawbacks are apparent: (1) The diversity of sizes of light sources brings inconveniences of redesigning of the circuit boards; (2) As regards LED light sources with a certain illumination angle, especially for annular light sources, the inconsistency between the propagation direction of emergent light of LEDs and the propagation direction of emergent light of light sources causes bad illuminating effects and inefficiency.

Moreover, all the existing LED light sources need to be used collectively with an independent light source controller, and one light source controller can drive one or more light sources, resulting in high system costs, large volumes and inconvenience of use; the light source has flash synchronized triggering function, which is achieved by a device outside the light source and the light source controller sending a flash synchronized signal to the light source controller, and the delay of the flash is relatively long.

Therefore, those skilled in the art devote themselves to developing an LED light source for industrial inspection, resolving the aforesaid defects in the prior art.

SUMMARY OF THE INVENTION

In order to attain the above-mentioned objectives, the present invention provides an LED light source, characterized by comprising one or a plurality of LED modules, said LED modules comprising LEDs and circuit boards, said LEDs being fixed to said circuit boards, said circuit boards having electrodes thereon, the pins of said LEDs being electrically connected to said electrodes.

Optionally, said LED light source also comprises a drive circuit, said drive circuit being electrically connected to said circuit board, and being arranged within the enclosure of said LED light source together with said LED modules.

Optionally, said electrodes of said plurality of LED modules are connected to each other by conductive wires or electric connectors so that said LEDs in each of said LED modules are connected in series.

Furthermore, said electrodes of said plurality of LED modules are connected to each other by conductive wires or electric connectors so that said LEDs in each of said LED modules are connected in parallel.

Furthermore, each of said LED modules are arranged such that the propagation directions of emergent light of said LEDs of at least two of said LED modules are different.

Optionally, said LED light source also comprises a bearing structure, said bearing structure having one bearing surface for bearing said one LED module, or having a plurality of bearing surfaces for bearing said plurality of LED modules.

Optionally, said LED light source also comprises a bearing structure, said bearing structure having a plurality of bearing surfaces for bearing said LED modules, each of said bearing surfaces being arranged such that the normal directions of at least two of said bearing surfaces are different.

Furthermore, the bottom surfaces of said circuit boards of each of said LED modules are jointed to each of said bearing surfaces, respectively.

Furthermore, the bottom surfaces of said circuit boards are glued to said bearing surfaces, or fixed to said bearing surface by fasteners.

Furthermore, said bearing structure has at least one recess, each of said bearing surfaces being dispersed in said recesses, the openings of said recesses being light emitting windows of said bearing structure, emergent light of said LEDs in said LED modules on each of said bearing surfaces emerging via said light emitting windows of said bearing structure.

Optionally, said LED light source also comprises an enclosure, light emitting windows of said LED light source being disposed on said enclosure, said bearing structure being arranged within the enclosure of said LED light source, said LEDs in said LED modules on each of said bearing surfaces facing said light emitting windows of said LED light source.

Optionally, said LED light source also comprises an enclosure, said bearing structure being partly arranged within the enclosure of said LED light source and jointed to the enclosure of said LED light source, said openings of said recesses forming the light emitting windows of said LED light source.

Optionally, said LED light source also comprises an enclosure, at least one light emitting window of said LED light source being disposed on said enclosure, said bearing structure being arranged within the enclosure of said LED light source, and said light emitting windows of said bearing structure facing said light emitting windows of said LED light source, the emergent light of said LEDs in said LED modules on each of said bearing surfaces emerges successively via said light emitting windows of said bearing structure and said light emitting windows of said LED light source.

Furthermore, said LED light source also comprises a transparent cap, a partly transparent lambency cap or a diffuser cap disposed on said light emitting windows of said LED light source.

Furthermore, said LED light source also comprises a drive circuit disposed within said enclosure.

Furthermore, each of said LEDs is connected in series between a current output end and a current input end of said drive circuit.

Furthermore, said drive circuit also comprises two input ends for accepting power supply and trigger signals from outside, respectively.

Furthermore, said LED light source is used for illuminating an object while industrial cameras taking pictures of said object, said trigger signals being trigger signals synchronized with the flash of flash lamps of said industrial cameras, said trigger signals being electrical signals.

Furthermore, said trigger signals are high-level signals, low-level signals or PWM signals.

Furthermore, said drive circuit comprises an LED driving chip, the voltage input ends of said LED driving chip being connected to an external DC power source, said trigger signals being input directly to said LED driving chip.

Furthermore, the voltage of said DC power source is 3-27 V.

Furthermore, said LED driving chip is LM3429, said trigger signals being input directly to nDIM end of said LED driving chip.

Furthermore, said circuit board is a PCB board.

Furthermore, said circuit board is a rectangular board.

Furthermore, said circuit board is 4-50 mm in length, 4-50 mm in width and 0.2-5 mm in thickness.

In one preferred embodiment of the present invention, there is provided an LED light source, comprising a plurality of LED modules therein. Each of the LED modules includes one LED and one PCB board, the LED being fixedly arranged on the PCB board and electrically connected to the electrodes on the PCB board. The LED light source also comprises a bearing structure having a plurality of bearing surfaces, these bearing surfaces for bearing LED modules having different normal directions, thereby enabling each LED module to be fixed thereon with an established angle. The drive circuit is disposed in the LED light source, and is electrically connected to the LEDs in each of LED modules to enable each LED to be connected in series between a current output end and a current input end of the drive circuit. The drive circuit accepts DC voltage of 3-27 V, receives trigger signals synchronized with the flash of flash lamps of said industrial cameras, and supplies power to each LED upon receiving the trigger signals, enabling it to emit light.

It can be seen that the present invention has the following advantageous effects:

(1) By adopting the LED modules with modular design, the combination is easy, the transplant of the design is convenient, and for light sources of different sizes or shapes, it is only necessary to rearrange the layout and positions of the LED modules, avoiding the needs of redesigning of PCB board for bearing a plurality of LEDs, in which way the product design could be implemented quickly;

(2) The illumination angle is easy to be adjusted, the lighting efficiency is high, the lighting intensity is more uniform, and designing the layout of each bearing surface of the bearing structure according to the preset illumination effects of the light source not only optimizes the illuminating effects, but also increases the use efficiency of light.

(3) The time delay of flash synchronization is small, the LED modules are connected in series, and utilizing constant current driving integrated with flash synchronized trigger signals, the synchronizm is high;

(4) The drive circuit is arranged in the LED light source, that is, the controller of the light source is integrated into the light source, thereby being able to lower the system costs, reduce the volume, facilitate the use, the external influence on the light emitting of the light source is reduced, and the consistency of the brightness of the light source is good;

(5) By adopting external trigger control function, the light source is turned on only if it is required, which not only lowers the power consumption, but also lowers the stimuli of the light source to human eyes, and provides necessary conditions for time-sharing of a plurality of light sources.

For a more complete understanding of the purposes, features and effects of the present invention, the conceptions, specific structures and resultant technological effects will be explained in a further detail herein, taken in conjunction with the accompanying drawings.

DETAILED DESCRIPTION OF THE PREFERRED EMBODIMENTS

Figure 1:
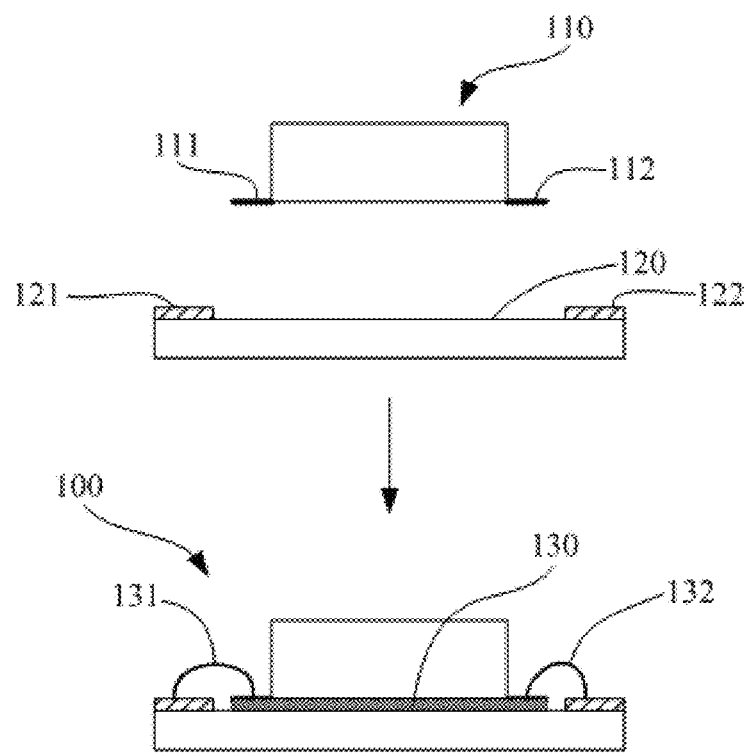
FIG. 1 is an example of the manufacturing method of LED modules used in the LED light source of the present invention.

An LED light source of the present invention uses one or more LED modules, which comprise LEDs and circuit boards, wherein the LEDs are fixed to the circuit boards, and the pins of said LEDs are electrically connected to the electrodes. FIG. 1 shows an example of the manufacturing method of LED modules 100.

As shown in FIG. 1, by applying a layer of adhesive 130 on the bottom surface of the LED 110 and/or the upper surface of the circuit board 120, the LED 110 is bonded to the circuit board 120, two pins 111, 112 of the LED 110 are electrically connected through conductors 131, 132 to two electrodes 121, 122 of the circuit board 120, respectively, and the production of the LED module 100 is finished. Wherein, the LEDs could be any commercially available or customized LED emitter or COB; additionally, although the LED 110 shown in the figure is surface-mounted type, an in-line type is also adoptable, it is only necessary to design a circuit board matched with it, for example, arranging through holes for jointing the pins of the in-line type LEDs at corresponding positions of the circuit board.

Preferably, the circuit board 120 is a PCB board, which is inexpensive and has mature technology, but it is also possible to adopt circuit boards of other materials according to actual requirements, for example, ceramic circuit boards. Preferentially, the circuit board 120 is a rectangular board with dimensional ranges of 4~50 mm in length, 4~50 mm in width, and 0.2~5 mm in thickness. Preferably, the power range of the LED 110 is 0.01~3 W, the colors could be conventional colors such as white, red, blue, green, yellow, amber and the like, and the type is surface-mounted type or in-line type. The adhesive 130 could be electronic glue such as organic silicon gel, instant adhesives, UV adhesives, epoxy glue and the like. The conductors 131, 132 could be conductive wire, soldered or stamping-welded gold wire, aluminium wire and the like. In addition, it is shown in this example that one LED 110 is fixed on the circuit board 120, but it is also possible to fix a plurality of LEDs thereon according to actual requirements, and these LEDs are electrically connected between electrodes 121, 122.

Figure 2:
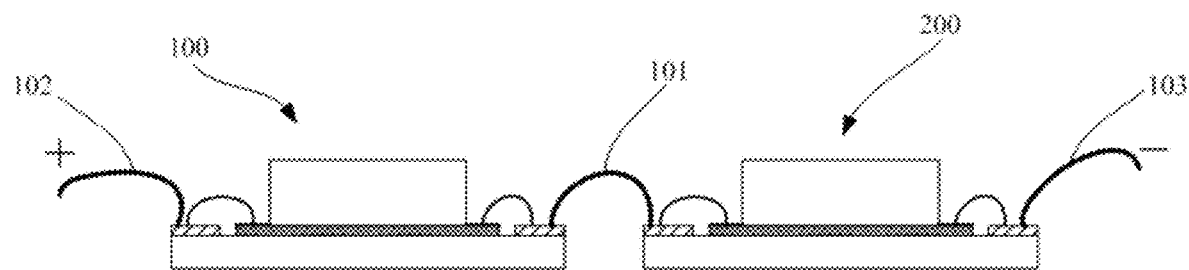
FIG. 2 shows two LED modules as shown in FIG. 1 connected in series.

The electrodes 121, 122 on the circuit board 120 of the LED module 100 are used for connecting to electrodes on the circuit boards of other LED modules to attain electric connections among LEDs in these LED modules. The connections among these LEDs could be in series, or in parallel. As shown in FIG. 2, LEDs in the LED modules 100 and 200 are connected in series by connecting one electrode on the circuit board in the LED module 100 with one electrode on the circuit board in the LED module 200 through a conductive wire 101; and by eliciting a conductive wire 102 from another electrode on the circuit board in the LED module 100 and eliciting a conductive wire 103 from another electrode on the circuit board in the LED module 200, the LEDs in the LED modules 100 and 200 could be connected to LEDs on other LED modules, or connected to external circuits.

Figure 3:
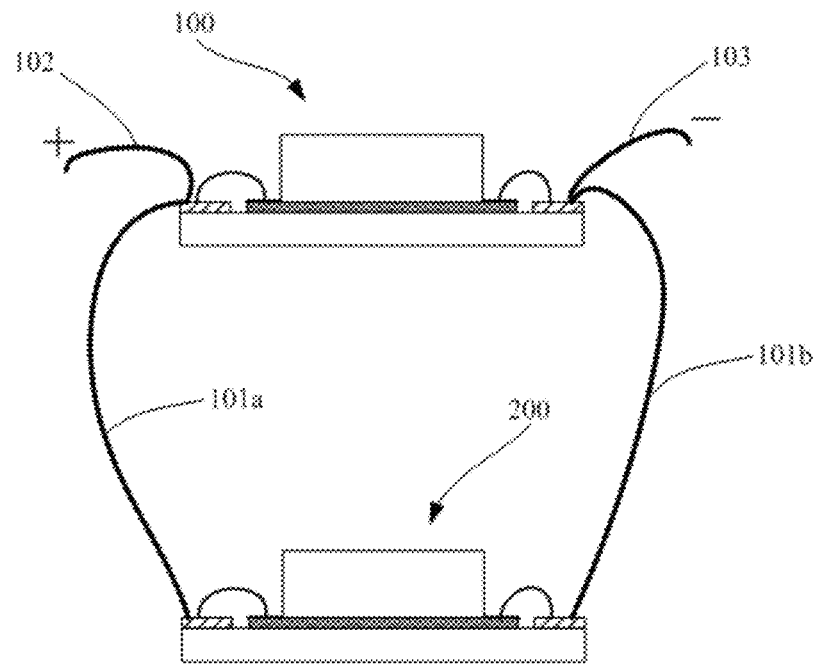
FIG. 3 shows two LED modules as shown in FIG. 1 connected in parallel.

Similarly, FIG. 3 shows the electric connection method for connecting the LEDs in the LED modules 100 and 200 in parallel, wherein, the LEDs in the LED modules 100 and 200 are connected in parallel by conductive wires 101a, 101b, and the LEDs in the LED modules 100 and 200 are connected to LEDs in other LED modules, or to external circuits by conductive wires 102, 103.

In addition, between each LED module connected in series or in parallel, the electric connection between the electrodes thereon can also be attained by electric connectors. One part of the two parts mated with each other of the electric connector is connected to an electrode in one LED module by conductive wire, the other part is connected to an electrode in another LED module by conductive wire, in this way, by mating and demating between the two parts of the electric connector, the electric connection between these two LED modules could be advantageously attained and relieved. For the LED modules used in the LED light source of the present invention, the electric connection between two LED modules could be usually attained by selecting wire-to-board type connectors, for example, the products of corporations such as Molex, JST and the like.

LEDs could be current driven, or voltage driven, but the brightness of voltage driven LEDs is easily susceptible to voltage fluctuation, while the brightness of current driven LEDs is not easily susceptible to voltage fluctuation. Therefore, LEDs as light sources are preferably constant current driven, and each LED is preferably connected in series. The arrangement method of LED modules of LED light source of the present invention is illustrated with two LED modules connected in series by way of example hereinafter.

Figure 4:
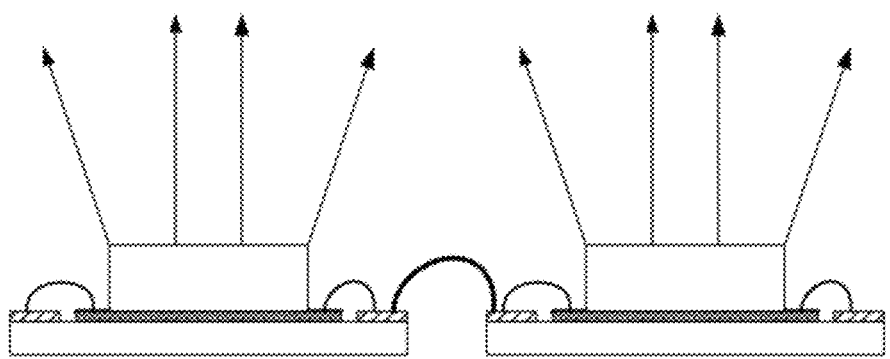
FIGS. 4-9 show the different positional relationships between two LED modules as shown in FIG. 1.
Figure 5:
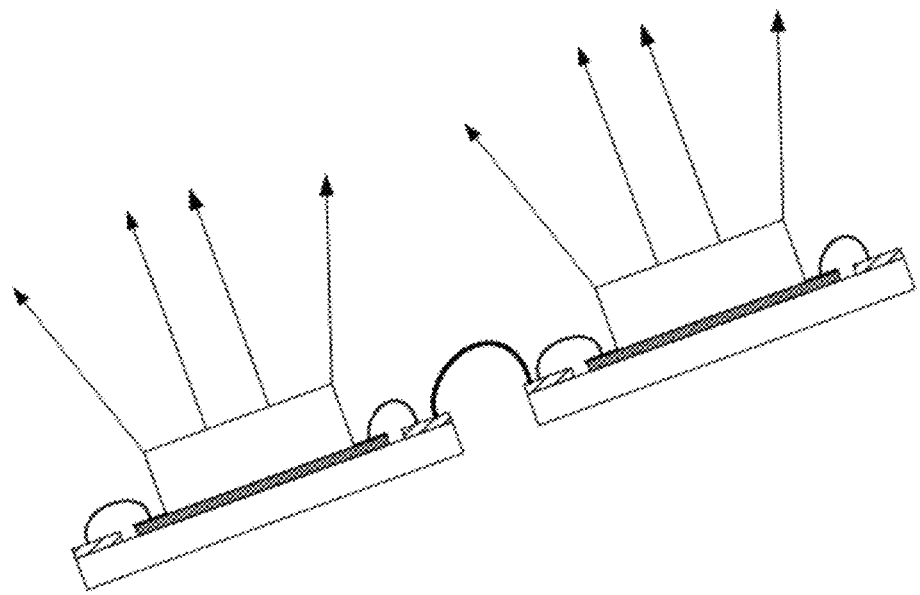
Figure 6:
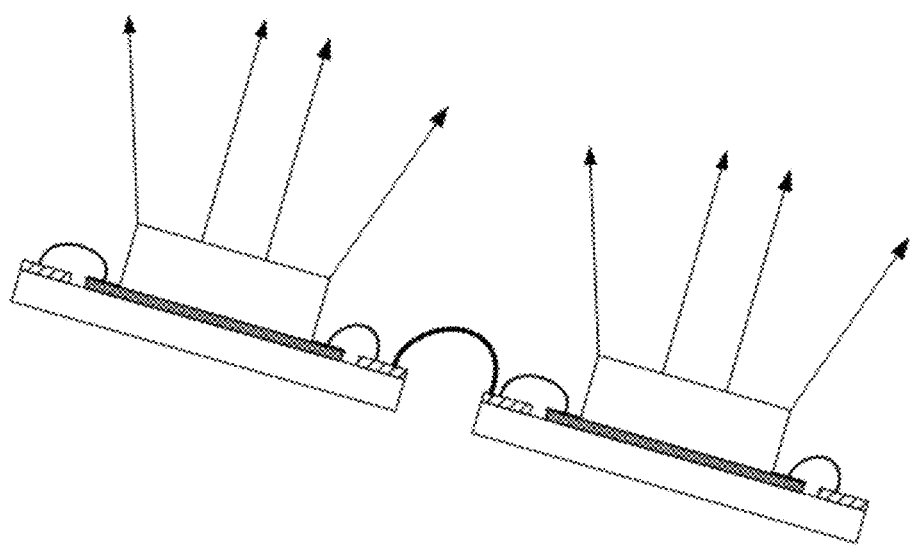
Figure 7:
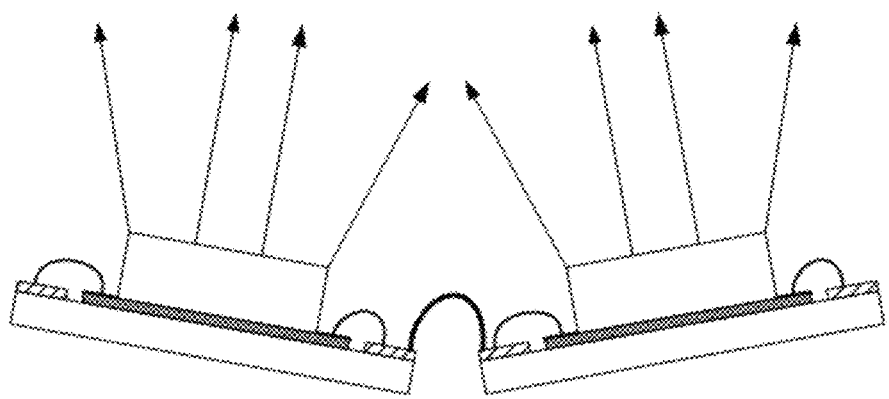
Figure 8:
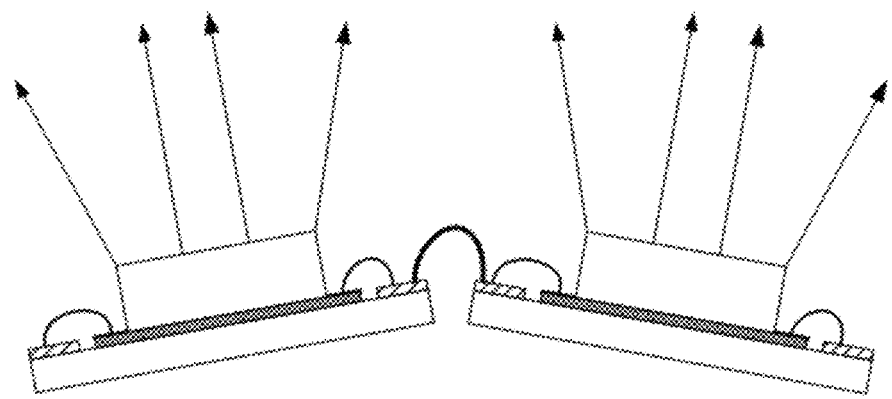
Figure 9:
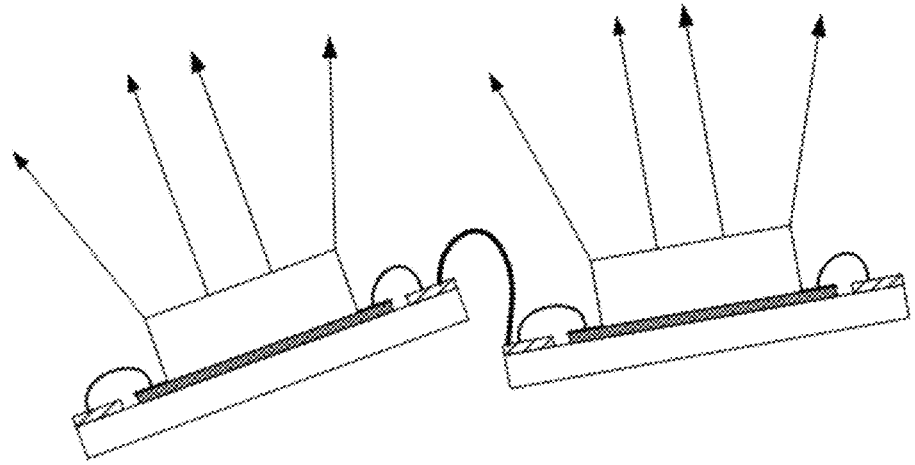

As shown in FIG. 4, while two LED modules connected in series are positioned horizontally, the propagation directions of emergent light of two LEDs thereon is upwards (the direction of emergent light denoted by arrows), the propagation directions of their emergent light coinciding. While these two LED modules are put obliquely, as shown in FIGS. 5 and 6, the propagation directions of emergent light of two LEDs thereon coincide, but deflexion occurs relative to the propagation directions of emergent light in FIG. 4. It is easily seen in the figure that the deflection angle is determined by the sloping angle of the LED modules herein relative to the LED modules in FIG. 4. Additionally, two LED modules can also be put obliquely relative to each other, as shown in FIGS. 7-9, the propagation directions of emergent light of two LEDs are inconsistent, and as a result, the range of illumination of the two LEDs herein decreases (FIG. 7) or increases (FIGS. 8 and 9) relative to that of the LEDs as shown in FIG. 4; accordingly, the intensity of illumination will also be changed, for example, the intensity of illumination in the case as shown in FIG. 7 increases, and that as shown in FIGS. 8 and 9 decreases.

In order to obtain the preset illumination effects of the LED light source, it is necessary to arrange each LED module at established positions at an appropriate angle, the LED light source of the present invention uses bearing structures to bear each LED module. A plurality of bearing surfaces are disposed on the bearing structures for bearing each LED module, respectively, and by fixing the bottom surfaces of the LED module to the corresponding bearing surface, arranging each LED module at established positions at an appropriate angle could be attained.

FIGS. 10-13 show the structures of three bearing structures, which not only are able to bear a plurality of LED modules, but also are able to serve as the light emitting windows of LED light source, which are described hereinafter, respectively.

Figure 10:
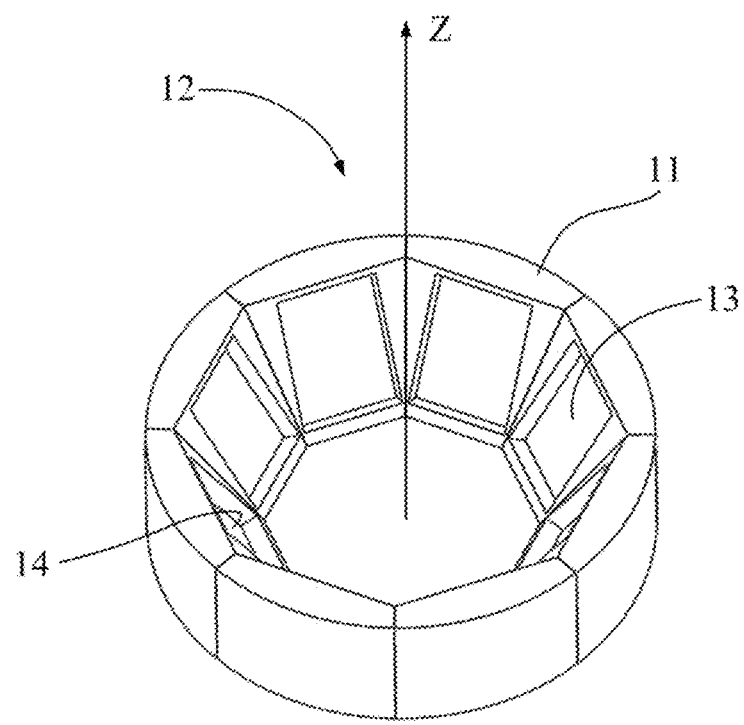
FIG. 10 shows a structure of the bearing structures used in the LED light source of the present invention.

As shown in FIG. 10, the periphery of the bearing structure 10 (see FIG. 13) is annular, and there is one recess 12 therein, in which there are disposed 8 bearing surfaces, such as bearing surfaces 13, 14, concretely, on the sidewalls of the recess 12. The bearing structure 10 of the example is an axisymmetric structure, which has the central axis Z axis, the upper surface 11 of which is perpendicular to Z axis. 8 bearing surfaces face Z axis obliquely upwardly, and dent inwardly (away from Z axis), forming 8 quadrangular recesses, the shapes of which are adapted to the LED modules. 8 LED modules are embedded in the 8 recesses respectively, the bottom surfaces of which are jointed to the bearing surfaces. In order to make the structure more firmly, it is possible to apply a layer of adhesive between the bottom surface of the LED module and the bearing surface, gluing the bottom surface to the bearing surface. Wherein, the adhesive could be electronic glue such as organic silicon gel, instant adhesives, UV adhesives, epoxy glue and the like. Additionally, it is also possible to connect the circuit boards of each LED module to the bearing structure 10 fixedly by fasteners such as bolts, rivets and the like, enabling the bottom surfaces of circuit boards to joint to the corresponding bearing surfaces fixedly.

The bearing surfaces 13, 14 face to each other obliquely, the two LED modules are put on top of the bearing surfaces 13, 14, respectively, and the position relationship between the two LED modules is similar to that as shown in FIG. 7 (the circuit connection is not considered). It will be appreciated that when 8 LED modules are put on these 8 bearing surfaces and emit light, the global emergent light is traveling along Z axis, and has a smaller illumination range and a larger intensity of illumination than emergent light of 8 LEDs horizontally put (similar to those as shown in FIG. 4), that is, relative to 8 LED modules put horizontally, emergent light of 8 LED modules herein is converged. We can believe that for the bearing structure 10 bearing a plurality of LED modules, the opening of the recess 12 on the upper surface 11 is light emitting window, and the upper surface 11 is light emitting surface. Preferably, the recess 12 is a through hole, the other opening of which is used for the conductive wire to pass through (see FIG. 13, the concrete details will be described below).

The bearing structure 10 in the example could be easily extended to the cases where there are other numbers of bearing surfaces (not less than 4), which are uniformly distributed over the sidewalls of the recess 12, surround Z axis and face Z axis obliquely upwardly. When the LEDs of the LED modules arranged on these bearing surfaces emit light, there will be aforesaid converge effect.

Figure 11:
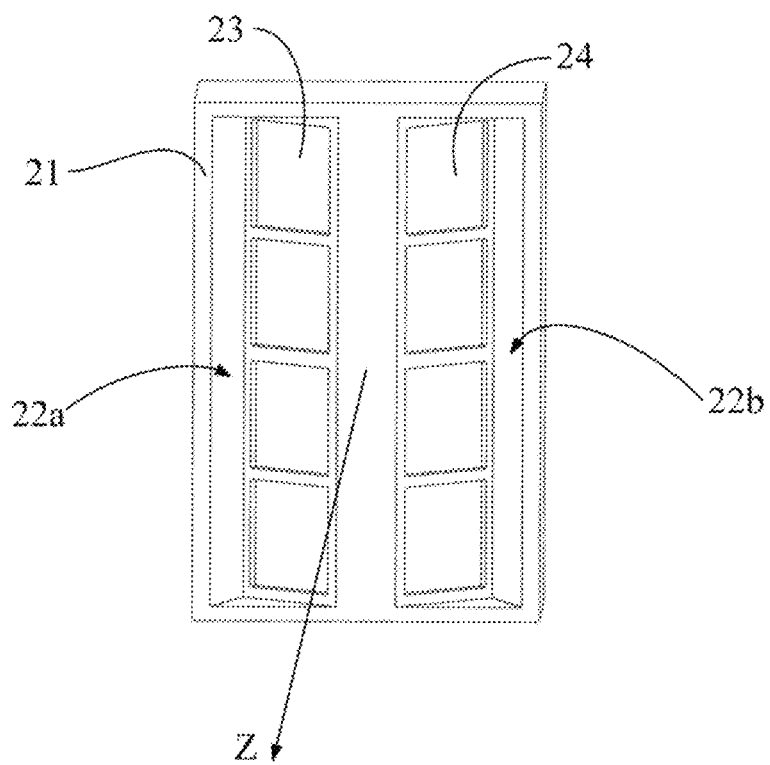
FIG. 11 shows another structure of the bearing structures used in the LED light source of the present invention.

The periphery of the bearing structure as shown in FIG. 11 is square, wherein, there are two recesses 22a, 22b side by side of V-groove shape, and on the recess 22a, specifically, on the oblique sidewalls of the recess 22a, there are disposed 4 bearing surfaces, such as bearing surface 23; on the recess 22b, specifically, on the oblique sidewalls of the recess 22b, there are disposed 4 bearing surfaces, such as bearing surface 24. The bearing structure in the example is a plane symmetrical structure, the symmetrical plane of which passes through Z axis, such as the plane passing through Z axis and parallel to the upper surface of the bearing structure in the FIG. 11, as well as the plane passing through Z axis and perpendicular to the upper surface of the bearing structure in the FIG. 11; the front surface 21 of the bearing structure is perpendicular to Z axis. 8 bearing surfaces deviate from Z axis obliquely upwardly, and dent inwardly (facing towards Z axis), forming 8 quadrangular recesses, the shapes of which are adapted to the LED modules. 8 LED modules are embedded in the 8 recesses respectively, the bottom surfaces of which are jointed to the bearing surfaces. In order to make the structure more firmly, it is possible to apply a layer of adhesive between the bottom surface of the LED module and the bearing surface, gluing the bottom surface to the bearing surface. Wherein, the adhesive could be electronic glue such as organic silicon gel, instant adhesives, UV adhesives, epoxy glue and the like. Additionally, it is also possible to connect the circuit boards of each LED module to the bearing structure fixedly by fasteners such as bolts, rivets and the like, enabling the bottom surfaces of circuit boards to joint to the corresponding bearing surfaces fixedly.

The bearing surfaces 23, 24 deviate from each other obliquely, two LED modules are put on top of the bearing surfaces 23, 24, respectively, and the position relationship between the two LED modules is similar to that as shown in FIG. 8 (the circuit connection is not considered). It will be appreciated that when 8 LED modules are put on these 8 bearing surfaces and emit light, the global emergent light has a larger illumination range and a smaller intensity of illumination than emergent light of 8 LEDs horizontally put (similar to those as shown in FIG. 4), that is, relative to 8 LED modules put horizontally, emergent light of 8 LED modules herein is diffused. We can believe that for the bearing structure bearing a plurality of LED modules in the example, the two openings of the recesses 22a, 22b on the front surface 21 are two light emitting windows, and the front surface 21 is light emitting surface. On the sidewalls of the recesses 22a, 22b in the example, there could be disposed through holes for the conductive wire to pass through. Or optionally, under the premise of not affecting the light emitting effect of the LED light source, it is also possible to elicit the conductive wire connecting the LED module and the drive circuit from the LED module to the drive circuit through the openings of the recesses 22a, 22b.

The bearing structure in the example could be easily extended to the cases where there are other numbers of bearing surfaces (2n, n is a natural number) in double row strip-shaped light source, which are uniformly distributed over the sidewalls of the two recesses 22a, 22b, and deviate from Z axis obliquely upwardly. When the LEDs of the LED modules arranged on these bearing surfaces emit light, there will be aforesaid divergence effect.

Figure 12:
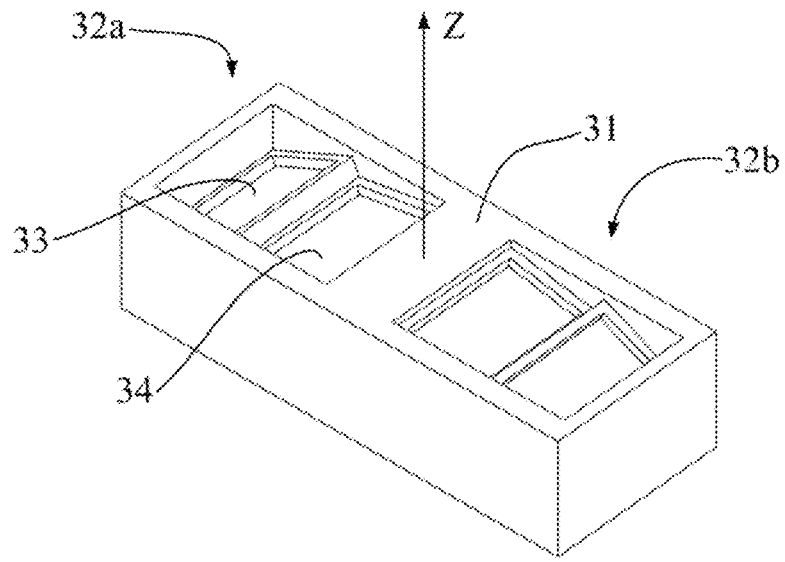
FIG. 12 shows yet another structure of the bearing structures used in the LED light source of the present invention.

The periphery of the bearing structure as shown in FIG. 12 is rectangular, wherein, there are two recesses 32a, 32b with W-shaped bottom surfaces arranged side by side of, and on the recess 32a, specifically, on the portions of the two oblique bottom surfaces of the recess 32a, there is disposed one bearing surface, respectively, such as bearing surface 33 and 34, the normal directions of which are different, and both deflect to the direction away from Z axis, wherein, the deflection angle of the normal of the bearing surface 33 is larger. For example, the included angle of the normal direction of the bearing surface 33 and Z axis is −30°, the included angle of the normal direction of the bearing surface 34 and Z axis is −10°, the recess 32b is similar to the recess 32a, the bottom surfaces of the recess 32b and the recess 32a are symmetric about the symmetrical plane passing through Z axis. For example, on the recess 32b, the included angle of the normal direction of the bearing surface symmetrical to the bearing surface 33 and Z axis is 30°, and the included angle of the normal direction of the bearing surface symmetrical to the bearing surface 34 and Z axis is 10°. The bearing structure in the example is a plane symmetrical structure, the symmetrical plane of which passes through Z axis, such as the plane passing through Z axis and parallel to the smaller sidewall of the bearing structure in FIG. 11, or the plane passing through Z axis and parallel to the bigger sidewall of the bearing structure in FIG. 11; the upper surface 31 of the bearing structure is perpendicular to Z axis. 4 bearing surfaces deviate from Z axis obliquely upwardly, and dent inwardly (facing towards Z axis), forming 4 quadrangular recesses, the shapes of which are adapted to the LED modules. 4 LED modules are embedded in the 4 recesses respectively, the bottom surfaces of which are jointed to the bearing surfaces. In order to make the structure more firmly, it is possible to apply a layer of adhesive between the bottom surface of the LED module and the bearing surface, gluing the bottom surface to the bearing surface. Wherein, the adhesive could be electronic glue such as organic silicon gel, instant adhesives, UV adhesives, epoxy glue and the like. Additionally, it is also possible to connect the circuit boards of each LED module to the bearing structure fixedly by fasteners such as bolts, rivets and the like, enabling the bottom surfaces of circuit boards to joint to the corresponding bearing surfaces fixedly.

The bearing surfaces 33, 34 deviate from each other obliquely, the two LED modules are put on top of the bearing surfaces 33, 34, respectively, and the position relationship between the two LED modules is similar to that as shown in FIG. 9 (the circuit connection is not considered). It will be appreciated that when 4 LED modules are put on these 4 bearing surfaces and emit light, the global emergent light is traveling along Z axis, and has a larger illumination range and a smaller intensity of illumination than emergent light of 4 LEDs horizontally put (similar to those as shown in FIG. 4), that is, relative to 4 LED modules put horizontally, emergent light of 4 LED modules herein is diffused. We can believe that for the bearing structure bearing a plurality of LED modules in the example, the two openings of the recesses 32a, 32b on the upper surface 31 are two light emitting windows, and the upper surface 31 is light emitting surface. On the bottom surfaces of the recesses 32a, 32b in the example, there could be disposed through holes for the conductive wire to pass through. Or optionally, under the premise of not affecting the light emitting effect of the LED light source, it is also possible to elicit the conductive wire connecting the LED module and the drive circuit from the LED module to the drive circuit through the recesses 32a, 32b.

The bearing structure in the example could be easily extended to the cases where there are other numbers of bearing surfaces (2n, n is a natural number) in single row strip-shaped light source, which are uniformly distributed over the zigzag bottom surfaces of the recesses 32a, 32b, and deviate from Z axis obliquely upwardly. When the LEDs of the LED modules arranged on these bearing surfaces emit light, there will be aforesaid divergence effect.

Figure 13:
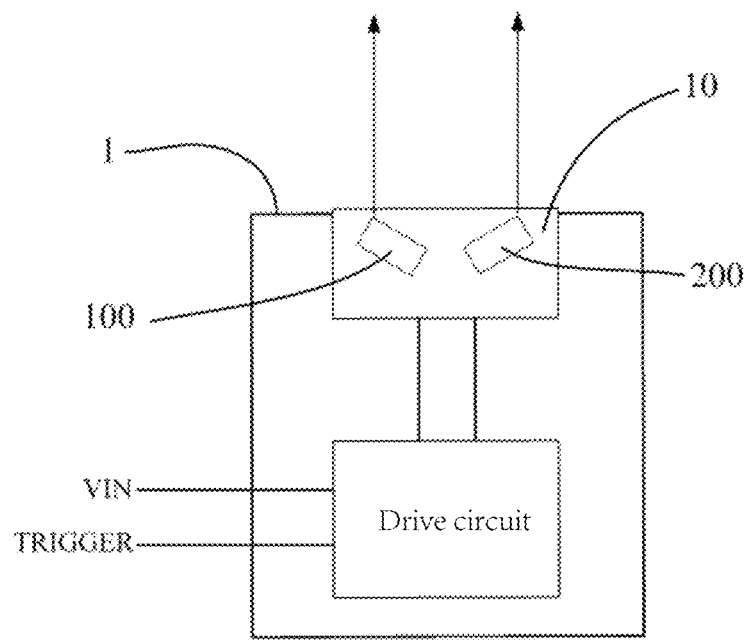
FIG. 13 shows a schematic diagram of the structure of LED light source of the present invention in one preferred embodiment, wherein the bearing structure as shown in FIG. 10 is used.

As shown in FIG. 13, in the present embodiment, the bearing structure 10 is partly arranged within the enclosure 1 of the LED light source, and the light emitting window (that is, the opening of the recess 12 on the upper surface 11) of the bearing structure 10 form the light emitting window of the LED light source. In other embodiments, it is also possible to arrange the bearing structure 10 within the enclosure 1 of the LED light source to enable the light emitting window of the bearing structure 10 to face towards the light emitting window of the LED light source, that is, emergent light of each LED, after emerging from the light emitting window of the bearing structure 10, emerges through the light emitting window of the LED light source. Additionally, for the bearing structure not having light emitting window, it is possible to arrange the bearing structure so that LEDs on each LED module on the bearing surface thereof face (face forwardly or face obliquely) the light emitting window of the LED light source, in this way, emergent light of each LED could emerge through the light emitting window of the LED light source.

The light emitting window determines the shape of the LED light source, for example, strip-shaped light source, surface light source, annular light source, arched light source, four-sided shadowless light source and the like. Therefore, for the bearing structure having light emitting windows, it is also necessary to take requirements for the shapes of light sources into account when designing. In addition, it is possible to arrange a transparent cap, a partly transparent lambency cap or a diffuser cap on the light emitting windows of the LED light source to perform dust prevention, moisture protection, and protect the structures in the LED light source, as well as obtain required illuminating effects.

Figure 14:
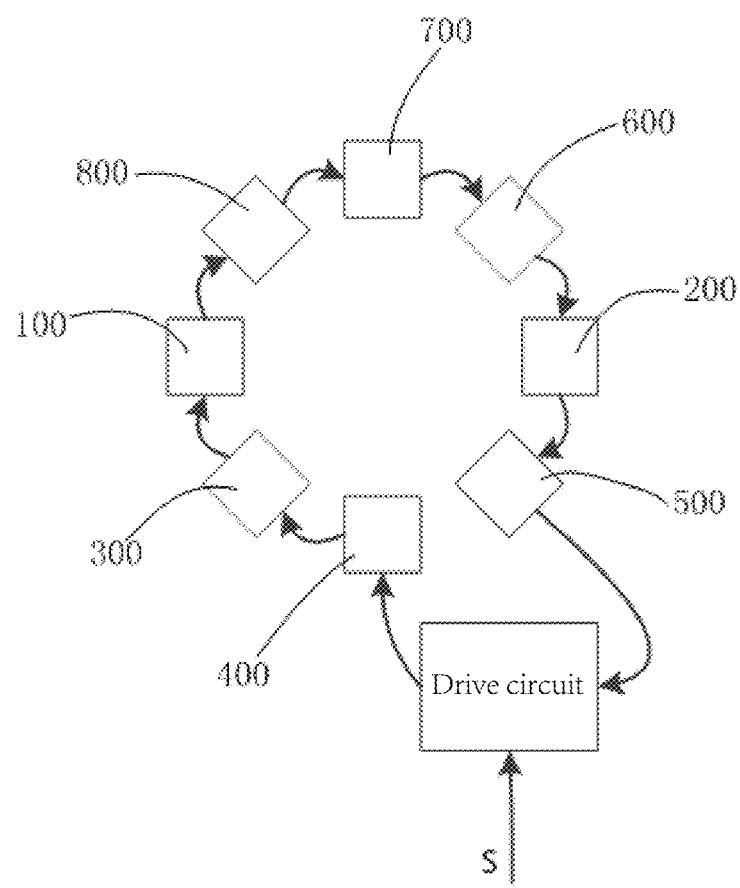
FIG. 14 shows the connection relationships between each LED module and the drive circuit in the LED light source of the present invention as shown in FIG. 13.

As shown in FIG. 13, in the embodiment, the LED light source of the present invention is integrated with a drive circuit, which is directly arranged within the enclosure 1 of the LED light source. The drive circuit has two input ends VIN and TRIGGER for connecting to the outside, and the input end VIN is used for receiving power supply from the outside, specifically, voltage of 3-24 V; input end TRIGGER is used for receiving trigger signals from the outside. The drive circuit also has a current output end and a current input end for connecting to the LED modules 100-800, 8 LED modules 100-800 connected in series are connected between the current output end and the current input end of the drive circuit, accepting constant current delivered by the drive circuit, and the connection relationship of the drive circuit with the LED modules 100-800 is as shown in FIG. 14. After the drive circuit receives trigger signals S from the input end TRIGGER from the outside, it provides current to the LED modules 100-800, the arrows between the drive circuit and the LED modules 100-800 indicating the direction of current. When used for industrial inspection, it is necessary to illuminate an object while industrial cameras taking pictures of the object, therefore, the trigger signals S are trigger signals synchronized with flash, that is, trigger signals that make the LED light source of the present invention to illuminate in synchronization with the flash lamps of industrial cameras, which are electrical signals, specifically, there are several implementation methods in the following:

1. Connect flash lamps of industrial cameras to the drive circuit herein directly, taking switching signals of flash lamps as trigger signals herein, which, generally, are high-level, low-level signals or PWM signals. If they are high-level, low-level signals, then they directly control the LEDs on the LED light source of the present invention to emit light, not emit light, or control LEDs to not emit light, emit light; if they are PWM signals, then adjusting of mean brightness of emergent light of the LED light source of the present invention could be realized.

2. By the peripheral equipment, for example, by the communication modules, simultaneously sending control signals controlling the on-off of flash lamps of industrial cameras to the drive circuit herein, the communications between the communication module and the drive circuit could adopt standard communication interface such as RS232 interface and the like, and in addition to controlling the LEDs on the LED light source to emit light, not emit light, the signals can also regulate brightness of emergent light of the LED light source by controlling the size of drive current/voltage outputted by the drive circuit.

Figure 15:
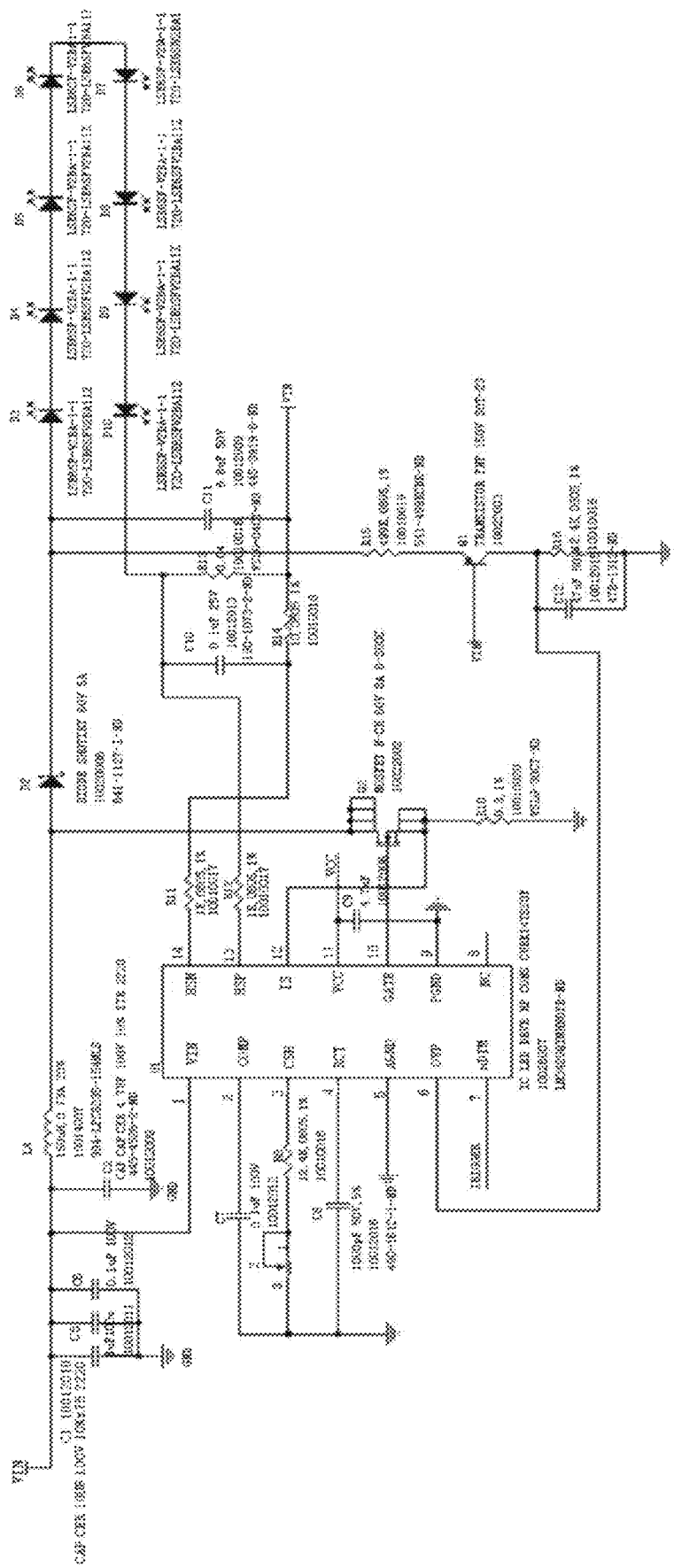
FIG. 15 shows the concrete circuit diagram of each LED module and the drive circuit as shown in FIG. 14.

FIG. 15 shows concrete circuit diagram of LEDs and the drive circuit on the eight LED modules as shown in FIG. 14, wherein, the drive circuit used LED driving chips U1, the model of which is LM3429. LED driving chip U1 is the core device of the drive circuit, the voltage input end VIN of which serves as the input end VIN of the drive circuit, trigger signal S is input directly to the nDIM end thereof, that is, the nDIM end of chip LM3429 serves as the input end TRIGGER of the drive circuit. There are applied a plurality of elements such as capacitors, resisters, transistors, inductor and the like on the drive circuit, thereby, the drive circuit can provide stable constant current to these eight LED modules. The models and sizes of these elements are indicated in the figures, the varistors thereon can change the size of current outputted by the drive circuit, thereby, change brightness of light emitted by each LED.

As shown in FIG. 15, LEDs in the LED modules 100-800 are D3, D4, D5, D6, D7, D8, D9 and D10, respectively, wherein, LED D3, D4, D5, D6, D7, D8, D9 and D10 are connected in series, LED D3 and LED D10 are connected to the current output end and the current input current input end of the drive circuit, respectively. When in use, the input ends VIN of the drive circuits are connected to outside power sources, the input ends TRIGGER are connected to the flash lamps of aforesaid industrial cameras or communication modules, upon receipt of trigger signals from the input ends TRIGGER, the drive circuits provide constant current to LED D3, D4, D5, D6, D7, D8, D9 and D10, which emit light right away. It is seen in the figure that since trigger signals are directly sent to the driving chips U1 of the drive circuit, the time delay of controlling is small.

It will be readily appreciated that if you want to use the drive circuit in FIG. 15 for other embodiments, for example, the situation that the bearing structure as shown in FIG. 12 bearing four LED modules, it is only necessary to replace LED D3, D4, D5, D6, D7, D8, D9 and D10 in FIG. 15 with the LEDs on these four LED modules, moreover, these LEDs can also be LEDs of other models, as long as the operating current required by these LEDs will not exceed the maximum driving voltage delivered by the drive circuit as shown in FIG. 15, and the drive circuit could be used directly.

In addition, the drive circuit of the LED light source of the present invention can also use other LED driving chips to accommodate the driving demand of a plurality of LEDs of different numbers and models, for example, as a contrast, the maximum drive current of LED driving chips LM3410 is 1.5 A, the maximum output voltage is 24V, and voltage input range is DC 2.7~5.5 V; the maximum drive current of LM3429 is 5 A, the maximum output voltage is 72V, and the voltage input range is DC 4.5-75 V.

When using other LED driving chips, the models and sizes of other elements on the drive circuit of LED light source of the present invention may remain unchanged, or the sizes thereof will be properly changed, without the needs for changing the circuit structure. This does not need creative works. Therefore, the structures of the drive circuits of these aforesaid simple modifications also pertain to the technical proposal of the present invention.

The preferred specific embodiments are described in greater detail hereinbefore. It is to be understood that a good many modifications and changes can be made by those skilled in the art, according to the conception of the present invention, without any creative labor. Therefore, any and all of the technical proposals that can be obtained by those skilled in the art, through logical analyses, reasoning or limited experiments, on the basis of the prior art, according to the conception of the present invention, are to be covered by the scope of protection determined by the claims.

The invention claimed is:

1. An LED light source, comprising:
   at least one LED component, said LED component comprising LEDs and circuit boards, said LEDs comprising pins and being fixed to said circuit boards, said circuit boards having electrodes thereon, the pins of said LEDs being electrically connected to said electrodes;
   wherein said LED light source also comprises a drive circuit, said drive circuit being electrically connected to said circuit boards, and being arranged within the enclosure of said LED light source together with said LED component; and
   wherein said drive circuit also comprises two input ends for accepting power supply and trigger signals from outside, respectively; and
   wherein said LED light source also comprises a bearing structure, said bearing structure having at least one bearing surface for bearing said LED component; and
   wherein each of said at least one bearing surface comprises at least one first recess, and each of the at least one first recess has a shape being adapted to said LED component, and each of said at least one LED component is embedded in corresponding one of said at least one first recess;
   wherein the number of said at least one LED component is more than one, said electrodes of said more than one LED components are connected to each other by conductive wires or electric connectors so that said LEDs in each of said more than one LED components are connected in series or are connected in parallel.

2. The LED light source according to claim 1, when said LEDs in each of said LED components are connected in series, each of said LED components is arranged such that propagation directions of emergent light of said LEDs of at least two of said LED components are different.

3. The LED light source according to claim 2, wherein said bearing structure having a plurality of bearing surfaces for bearing said LED components, each of said bearing surfaces being arranged such that normal directions of at least two of said bearing surfaces are different.

4. The LED light source according to claim 3, wherein the bottom surfaces of said circuit boards of each of said LED components are jointed to each of said bearing surfaces, respectively.

5. The LED light source according to claim 4, wherein said bearing structure has at least one second recess, each of said bearing surfaces being dispersed in said at least one second recess, the opening of said at least one second recess being light emitting windows of said bearing structure, emergent light of said LEDs in said LED components on each of said bearing surfaces emerging via said light emitting windows of said bearing structure.

6. The LED light source according to claim 5, wherein said bearing structure being partly arranged within an enclosure of said LED light source and jointed to the enclosure of said LED light source, said opening of said second recess forming the light emitting windows of said LED light source.

7. The LED light source according to claim 4, wherein light emitting windows of said LED light source being disposed on an enclosure, said bearing structure being arranged within the enclosure of said LED light source, said LEDs in said LED components on each of said bearing surfaces facing said light emitting windows of said LED light source.

8. The LED light source according to claim 7, wherein each of said LEDs are connected in series between a current output end and a current input end of said drive circuit.

9. The LED light source according to claim 3, wherein each of said LEDs are connected in series between a current output end and a current input end of said drive circuit.

10. The LED light source according to claim 1, wherein said bearing structure having one bearing surface for bearing said at least one LED component, or when the number of said at least one LED component is more than one, having a plurality of bearing surfaces for bearing said more than one LED components.

11. The LED light source according to claim 1, wherein said circuit boards are PCB boards.

12. The LED light source according to claim 1, wherein said circuit boards are rectangular boards.

13. A method for using an LED light source, wherein said LED light source comprises:
- at least one LED component, said LED component comprising LEDs and circuit boards, said LEDs comprising pins and being fixed to said circuit boards, said circuit boards having electrodes thereon, the pins of said LEDs being electrically connected to said electrodes;
- wherein said LED light source also comprises a drive circuit, said drive circuit being electrically connected to said circuit boards, and being arranged within an enclosure of said LED light source together with said LED component; and
- wherein said drive circuit also comprises two input ends for accepting power supply and trigger signals from outside, respectively; and
- wherein said LED light source also comprises a bearing structure, said bearing structure having at least one bearing surface for bearing said LED component; and
- wherein each of said at least one bearing surface comprises at least one first recess with a shape being adapted to said LED component, and said at least one LED component is embedded in said at least one first recess respectively;
- wherein said method comprises:
- illuminating an object by using said LED light source while industrial cameras take pictures of said object, and
- triggering said trigger signals through a flash of flash lamps of said industrial cameras, said trigger signals being electrical signals.

14. The method for using said LED light source according to claim 13, wherein said drive circuit comprises an LED driving chip, voltage input ends of said LED driving chip being connected to an external DC power source, said trigger signals being input directly to said LED driving chip.

15. The method for using said LED light source according to claim 14, wherein said LED driving chip is LM3429, said trigger signals being input directly to nDIM end of said LED driving chip; or said LED driving chip is LM3410, said trigger signals being input directly to DIM end of said LED driving chip.

* * * * *